(12) United States Patent
Kuromatsu

(10) Patent No.: US 9,571,783 B2
(45) Date of Patent: Feb. 14, 2017

(54) PORTABLE TERMINAL AND COMPUTER READABLE STORAGE MEDIUM

(71) Applicant: Tetsuya Kuromatsu, Tokyo (JP)

(72) Inventor: Tetsuya Kuromatsu, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 78 days.

(21) Appl. No.: 13/785,373

(22) Filed: Mar. 5, 2013

(65) Prior Publication Data

US 2013/0235219 A1   Sep. 12, 2013

(30) Foreign Application Priority Data

Mar. 6, 2012   (JP) .................. 2012-048924

(51) Int. Cl.
*G08B 26/00* (2006.01)
*H04N 5/76* (2006.01)
*G06K 7/10* (2006.01)

(52) U.S. Cl.
CPC ............ *H04N 5/76* (2013.01); *G06K 7/10158* (2013.01)

(58) Field of Classification Search
CPC ............... G06K 2017/0045; G06K 7/10158; G06K 7/10099; G06K 7/10108; G06K 7/10118; G01S 13/867; G06Q 20/208
See application file for complete search history.

(56) References Cited

U.S. PATENT DOCUMENTS

| | | | |
|---|---|---|---|
| 6,232,870 B1 * | 5/2001 | Garber et al. | 340/10.1 |
| 7,161,470 B2 * | 1/2007 | Berquist et al. | 340/10.31 |
| 8,055,296 B1 * | 11/2011 | Persson et al. | 455/556.1 |
| 8,126,195 B2 * | 2/2012 | Landers et al. | 382/100 |
| 8,146,799 B2 * | 4/2012 | Kempf et al. | 235/375 |
| 8,355,961 B1 * | 1/2013 | Ng et al. | 705/28 |
| 8,816,855 B2 * | 8/2014 | Kreiner et al. | 340/572.1 |
| 8,973,814 B2 * | 3/2015 | Wilke et al. | 235/375 |

(Continued)

FOREIGN PATENT DOCUMENTS

| | | |
|---|---|---|
| JP | 2005-228292 | 8/2005 |
| JP | 2008-160456 | 7/2008 |
| JP | 2009-049567 | 3/2009 |

OTHER PUBLICATIONS

Japanese Office Action for Japanese Application No. 2012-048924 mailed on Feb. 4, 2014 corresponding to U.S. Appl. No. 13/785,373, filed Mar. 5, 2013.

*Primary Examiner* — Hai Phan
*Assistant Examiner* — Son M Tang
(74) *Attorney, Agent, or Firm* — Amin, Turocy & Watson LLP

(57) ABSTRACT

A portable terminal and a computer readable storage medium are described. According to one implementation, a portable terminal includes, a storage section, an imaging section, a notifying section and a control section. The storage section stores item identification information to identify an item with a RFID tag attached corresponded with tag position information which shows a position of the RFID tag. The control section retrieves item identification information of an item corresponding to image data imaged by the imaging section from the stored item identification information, and allows the notifying section to notify the tag position information corresponding to the retrieved item identification information.

10 Claims, 11 Drawing Sheets

(56) References Cited

U.S. PATENT DOCUMENTS

| | | | | |
|---|---|---|---|---|
| 2005/0242953 | A1* | 11/2005 | Nakagawa | B65G 61/00 340/572.1 |
| 2006/0022814 | A1* | 2/2006 | Nogami et al. | 340/505 |
| 2006/0131418 | A1* | 6/2006 | Testa | G06K 7/10544 235/472.01 |
| 2007/0109128 | A1* | 5/2007 | Fujii | G01S 5/12 340/572.1 |
| 2008/0211631 | A1* | 9/2008 | Sakamoto | G01S 5/0205 340/10.1 |
| 2009/0002165 | A1* | 1/2009 | Tuttle | G01S 3/48 340/572.1 |
| 2009/0009626 | A1* | 1/2009 | Ko | H04N 1/00251 348/231.3 |
| 2009/0121828 | A1* | 5/2009 | Suzuki | G06Q 30/00 340/5.1 |
| 2010/0097221 | A1* | 4/2010 | Kreiner | G01S 13/82 340/572.1 |
| 2010/0258618 | A1* | 10/2010 | Philbrick | G06K 19/06 235/375 |
| 2012/0075076 | A1* | 3/2012 | Wang | G06K 7/10009 340/10.4 |
| 2012/0093369 | A1* | 4/2012 | Ryu | H04L 67/38 382/103 |
| 2012/0133487 | A1* | 5/2012 | Murofushi | G06K 7/10079 340/8.1 |
| 2012/0290591 | A1* | 11/2012 | Flynn | G06F 17/30247 707/754 |
| 2013/0049925 | A1* | 2/2013 | Subramanian | 340/3.1 |

* cited by examiner

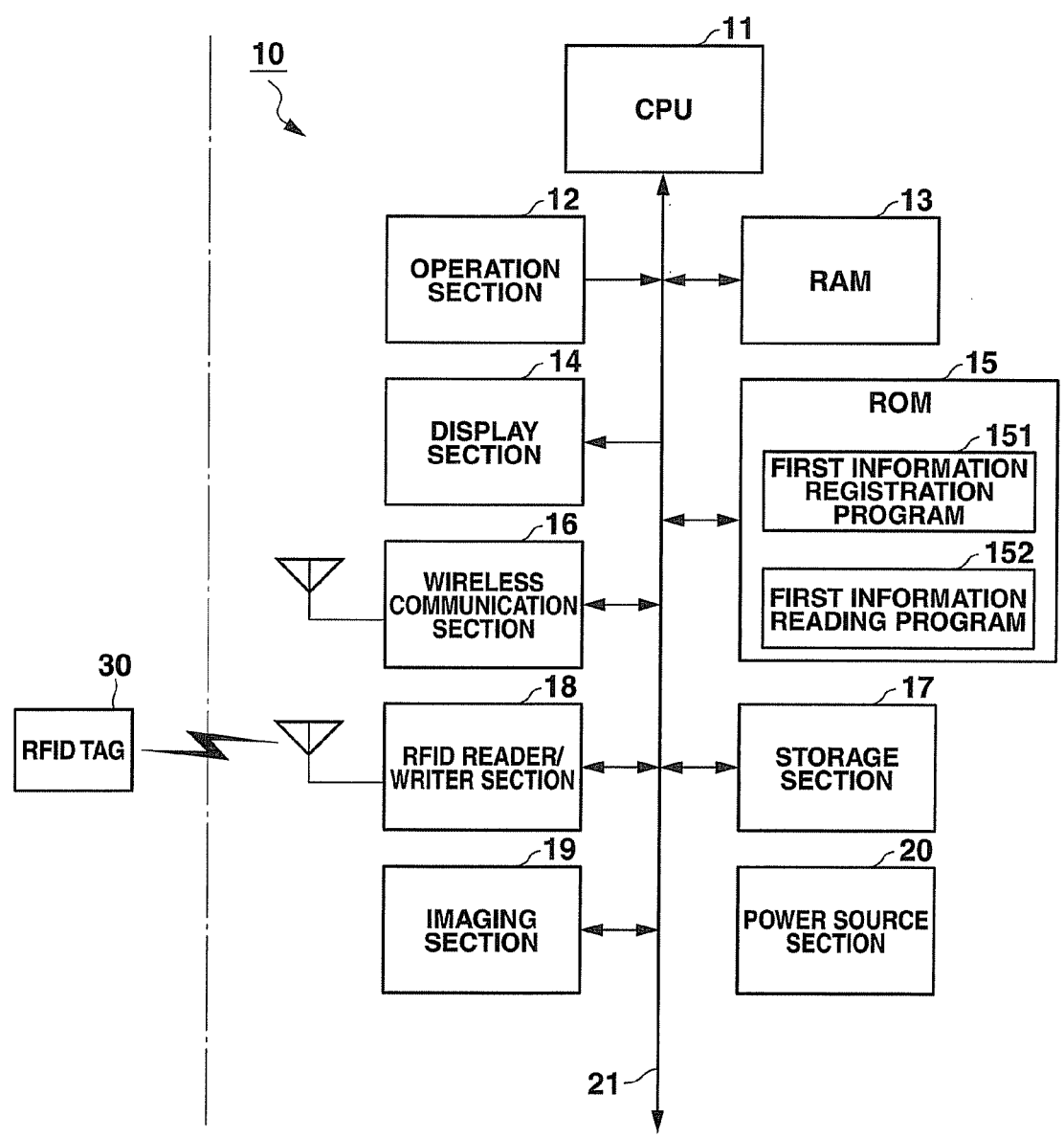

FIG.2A

| 41 | 42 | 43 | 40 |
|---|---|---|---|
| NUMBER | IMAGE DATA NAME | TAG POSITION INFORMATION | |
| ⋮ | ⋮ | ⋮ | |

FIG.2B

| 51 | 50 |
|---|---|
| IMAGE DATA | |
| ⋮ | |

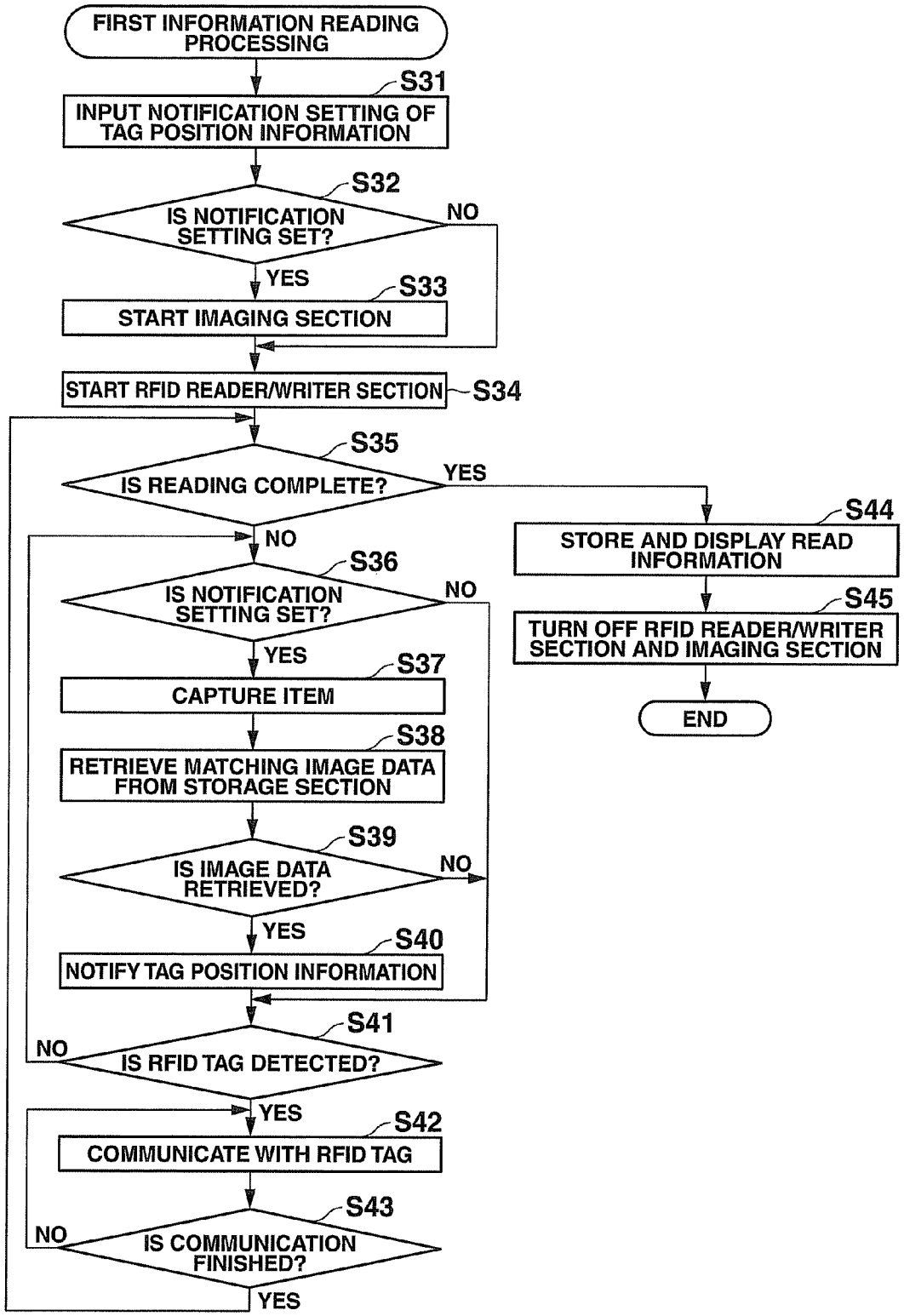

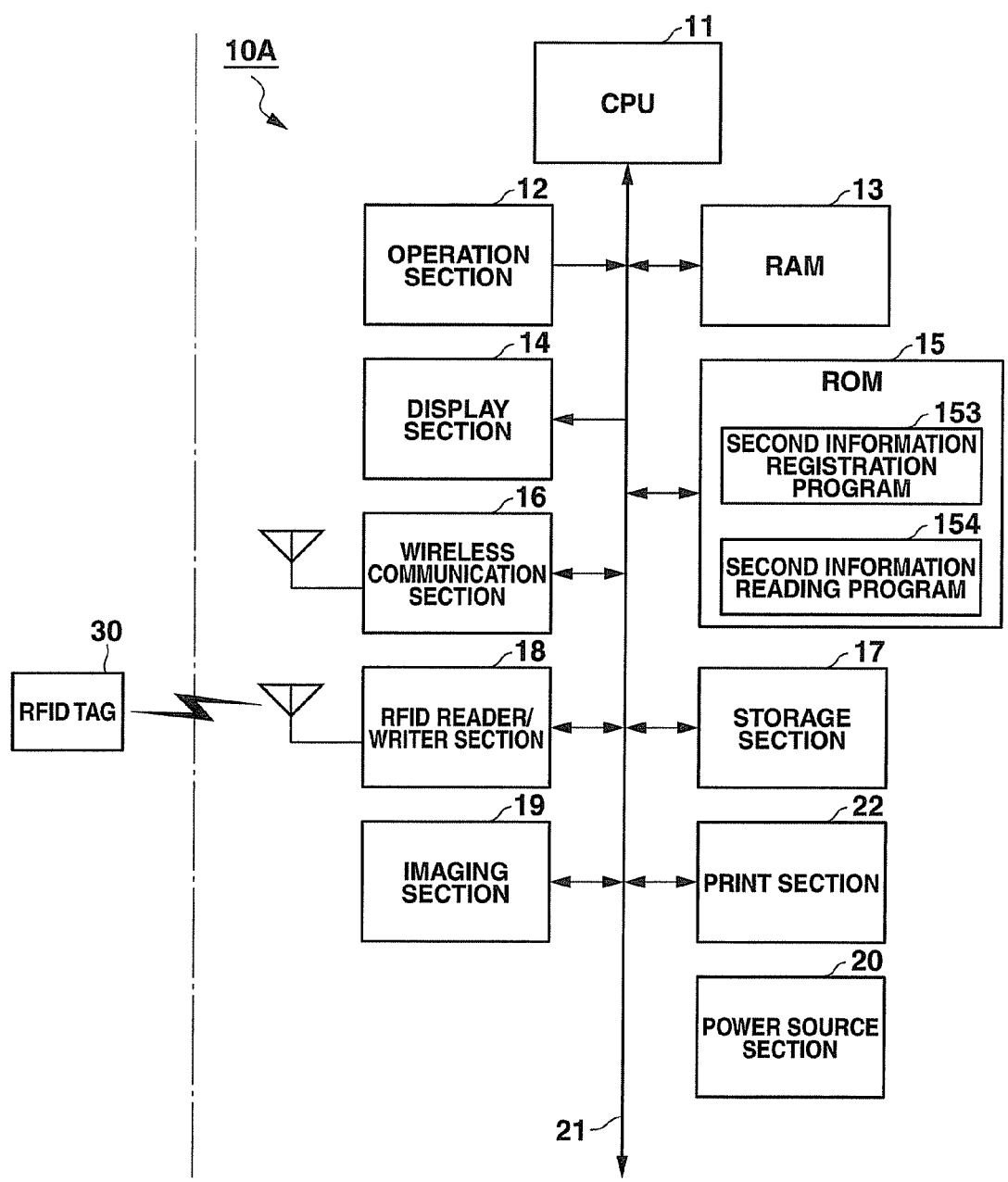

FIG.9

| NUMBER | CODE INFORMATION | TAG POSITION INFORMATION |
|---|---|---|
| ⋮ | ⋮ | ⋮ |

# PORTABLE TERMINAL AND COMPUTER READABLE STORAGE MEDIUM

BACKGROUND OF THE INVENTION

1. Field of the Invention

The present invention relates to a portable terminal and a computer readable storage medium.

2. Background Art

Conventionally, there is known a technique of RFID (Radio Frequency Identification) where a RFID scanner (RFID reader/writer) reads information from a RFID tag by wireless communication through radio waves or an electromagnetic field within a short distance.

The RFID tag stores individual identification information to be able to identify the RFID tag. When the RFID tag is attached to the outside of items such as merchandise, various equipment, etc., it is possible to identify the items by the user using the RFID scanner to read the individual identification information of the RFID tag. For example, an RFID tag is attached to equipment used for business purposes and the RFID tag attached to the equipment is read before and after use in the task to check whether all of the equipment is present.

The RFID scanner can simultaneously read individual identification information of a plurality of RFID tags. Therefore, there is known a wireless tag position estimate system in which a wireless tag communication device as a RFID scanner is moved toward a plurality of items with wireless tags as RFID tags to read information, a position of a desired wireless tag is estimated from a track of reading and response time and the estimated wireless tag position is displayed with the image of the plurality of items (for example, see Japanese Patent Application Laid-Open Publication No. 2008-160456).

There is also known an item position detection device where a plurality of wireless tags stored with a position ID are scattered in a target region, the position ID of the plurality of wireless tags are read, and the position where the position ID cannot be read is detected as the position where the item is placed (for example, Japanese Patent Application Laid-Open Publication No. 2005-228292).

However, when confirming the equipment used in the task, if the RFID tag is attached to the outside of the equipment, it is possible to judge the position of the tag from the outside. However, if the RFID tag is attached to the inside of the equipment or is internally mounted in the equipment, the user cannot confirm the position of the RFID tag by sight. Moreover, even if the RFID tag is attached to the outside of the equipment, the position where the RFID tag is attached may be a position where it is difficult to confirm or the attached RFID tag may be a color or shape which is difficult to confirm by sight.

The RFID scanner includes an antenna to read information of the RFID tag, and the information of the RFID tag is read by placing the antenna close to the RFID tag. However, when the user does not know the position of the RFID tag, it is not possible to position the antenna close to the RFID tag. Therefore, it is not possible to read the information of the RFID tag.

Moreover, with the above described conventional wireless tag position estimate system and item position detection device which estimates the position of the wireless tag, the position of the item itself is estimated, and it is not possible to notify the user of the position of the RFID tag in the item in which the RFID tag is mounted internally.

SUMMARY OF THE INVENTION

The present invention has been made in consideration of the above situation, and one of the main objects is to notify tag position information showing a position of a RFID tag attached to an item.

In order to achieve any one of the above advantages, according to an aspect of the present invention, there is provided a portable terminal including:

a storage section which stores item identification information to identify an item with a RFID tag attached corresponded with tag position information which shows a position of the RFID tag;

an imaging section which images an item;

a notifying section which notifies information; and a control section which retrieves item identification information of an item corresponding to image data imaged by the imaging section from the stored item identification information, and which allows the notifying section to notify the tag position information corresponding to the retrieved item identification information.

According to another aspect of the present invention, there is provided a non-transitory computer-readable storage medium having a program stored thereon for controlling a computer to execute the following process:

storing item identification information to identify an item with a RFID tag attached corresponded with tag position information which shows a position of the RFID tag;

imaging an item; and retrieving item identification information of an item corresponding to the imaged image data from the stored item identification information, and notifying the tag position information corresponding to the retrieved item identification information.

According to the present invention, it is possible to notify tag position information showing a position of a RFID tag attached to an item.

BRIEF DESCRIPTION OF THE DRAWINGS

The present invention and the above-described objects, features and advantages thereof will become more fully understood from the following detailed description with the accompanying drawings and wherein;

FIG. 1 is a block diagram showing a functional configuration of a portable terminal of the first embodiment of the present invention;

FIG. 2A is a diagram showing a configuration of a tag position information table of the first embodiment;

FIG. 2B is a diagram showing a configuration of an image database;

FIG. 4 is a flowchart showing first information reading processing;

FIG. 6 is a block diagram showing a functional configuration of a portable terminal of a second embodiment of the present invention;

FIG. 9 is a diagram showing a configuration of a tag position information table of a third embodiment;

DETAILED DESCRIPTION OF THE PREFERRED EMBODIMENT

Figure 3:
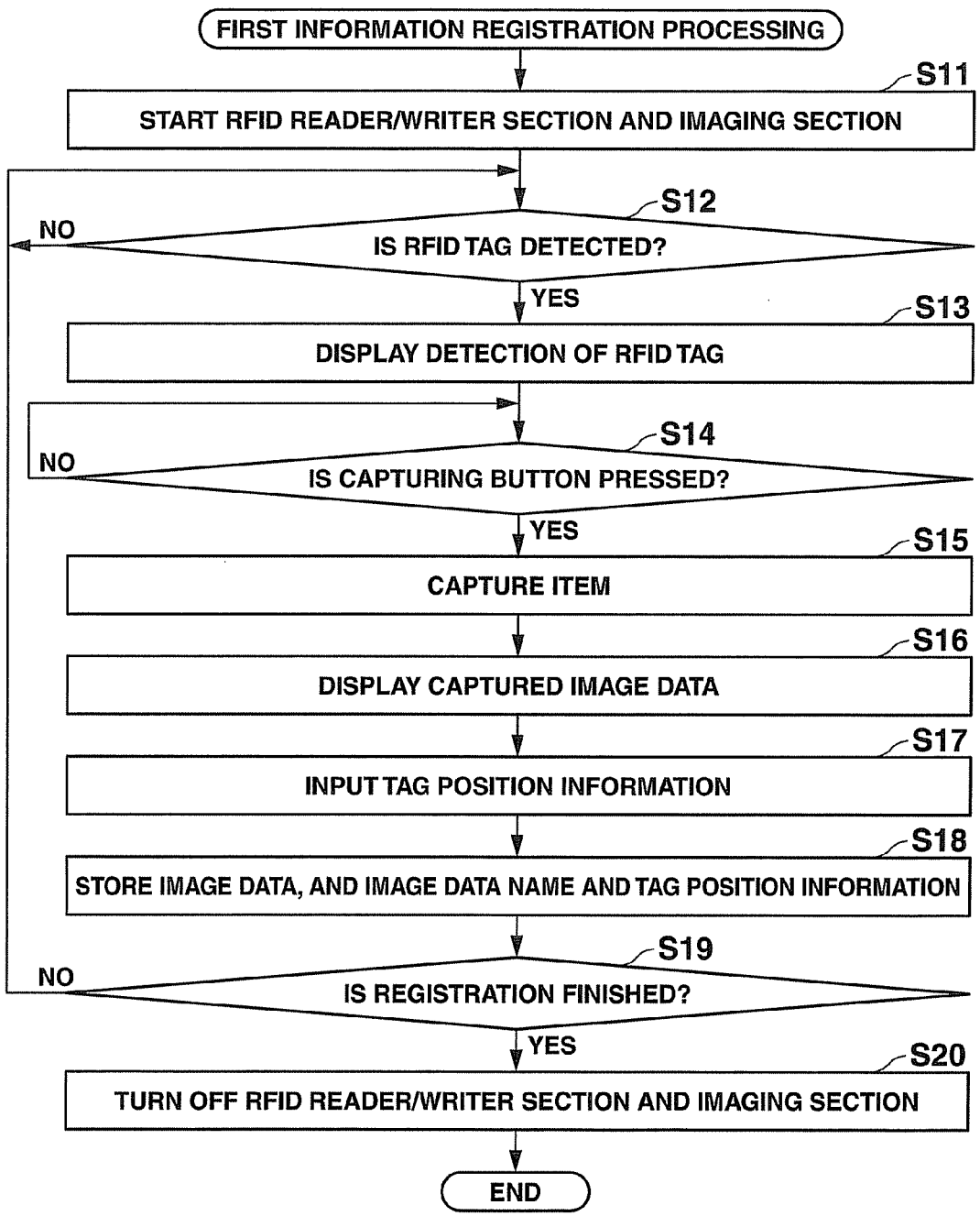
FIG. 3 is a flowchart showing first information registration processing.

The first to third embodiments of the present invention are described in detail in order with reference to the attached drawings. The present invention is not limited to the illustrated examples.

(First Embodiment)

The first embodiment of the present invention is described with reference to FIG. 1 to FIG. 5. First, a configuration of the apparatus of the present embodiment is described with reference to FIG. 1. FIG. 1 is a block diagram showing a functional configuration of a portable terminal 10 of the present embodiment.

The portable terminal 10 of the present embodiment is a handy terminal which performs display of tag position information showing a position of a RFID tag 30 attached to equipment as an item and reading of information stored in the RFID tag 30.

The present embodiment describes an example where the RFID tag 30 is mounted internally in the equipment as an item used for business purposes. The individual identification information stored in the RFID tag 30 in the equipment is read before use and after use of the equipment with the portable terminal 10 to confirm whether all of the equipment is present. However, the present invention is not limited to this example. The RFID tag 30 is not limited to a configuration internally mounted in the item, and the RFID tag 30 can be attached to the outside of the item, etc. The same can be said for the other embodiments.

The RFID tag 30 is a RFID tag of a radio wave type or an electromagnetic induction type. The RFID tag 30 includes a communication section including an antenna or a coil antenna, a control section, and an EEPROM (Electrically Erasable Programmable Read Only Memory). In the RFID tag 30, the control section uses the communication section to perform wireless communication with the portable terminal 10 through radio waves or an electromagnetic field to read information stored in the EEPROM according to a reading request received from the portable terminal 10 and to transmit the information to the portable terminal 10. Alternatively, the control section of the RFID tag 30 writes or rewrites the information received from the portable terminal 10 in the EEPROM.

The individual identification information of the RFID tag 30 is stored in the EEPROM of the RFID tag 30. The RFID tag 30 is a RFID tag of a passive type (passive tag) which obtains electric power by the radio waves or the electromagnetic field from the portable terminal 10.

Alternatively, the RFID tag 30 can be a RFID tag of an active type (active tag) which includes a power source section and outputs the radio waves or the electromagnetic field with the power of the power source section.

The portable terminal 10 includes a CPU (Central Processing Unit) 11 as a control section, an operation section 12, a RAM (Random Access Memory) 13, a display section 14 as a notifying section, a ROM 15, a wireless communication section 16, a storage section 17, a RFID reader/writer section 18 as a reading section, an imaging section 19, and a power source section 20. The sections of the portable terminal 10 other than the power source section 20 are connected to each other through a bus 21.

The CPU 11 controls each section of the portable terminal 10. The CPU 11 reads the specified program among the various programs from the ROM 15 to be expanded in the RAM 13. The CPU 11 performs various processing in coordination with the expanded program.

According to a first information registration program 151, the CPU 11 captures the item which is the subject with the imaging section 19 and obtains the image data. Then, the CPU 11 corresponds tag position information input on the operation section 12 to the image data to be stored in the storage section 17 as a tag position information table 40 and image database 50.

According to a first information reading program 152, the CPU 11 captures the item which is the subject with the imaging section 19 and obtains the image data. Then, the CPU 11 retrieves image data 51 of the item corresponding to the subject of the captured image data from the image data 51 stored in the image database 50 of the storage section 17.

When the image data 51 of the item is retrieved, tag position information 43 corresponding to the retrieved image data 51 is displayed on the display section 14 and information stored in the RFID tag 30 is read with the RFID reader/writer section 18.

The operation section 12 includes key groups including various keys such as character input key, etc., and outputs to the CPU 11 operation information according to input of pressing keys from the user.

The RAM 13 is a volatile semiconductor memory, with a work area to store various pieces of data and various programs.

The display section 14 is a display section including a display panel such as a LCD (Liquid Crystal Display), an EL (Electro Luminescent) display, etc., and performs various display on the display panel according to display information input from the CPU 11.

The ROM 15 is a read only semiconductor memory which stores various pieces of data and various programs. The ROM 15 stores a first information registration program 151 and a first information reading program 152.

The wireless communication section 16 is a wireless communication section in a wireless LAN (Local Area Network) communication format. The wireless communication section 16 includes an antenna, a modulating section, a demodulating section, a signal processing section, etc., and performs wireless communication with the access point.

The wireless communication section 16 processes the signal of the transmitted information in the signal processing section, modulates the signal with the modulating section and transmits the signal as a wireless radio wave from the antenna to the access point.

The access point is connected to a device of the communication target through, for example, a wired LAN. The wireless communication section 16 demodulates the received signal of the wireless radio wave received from the access point with the antenna in the demodulating section, processing the signal in the signal processing section and obtains receiving information.

As described above, the wireless communication section 16 performs communication with the device of the communication target through the access point. The wireless communication section 16 can perform wireless communication of another format.

The storage section 17 is a nonvolatile memory such as a flash memory or EEPROM (Electrically Erasable Programmable ROM), etc. which stores information to be readable and writable.

The storage section 17 stores a later described tag position information table 40 and an image database 50.

The RFID reader/writer section 18 is a reader/writer section of a radio wave type or an electromagnetic induction type which reads and writes information stored in the RFID tag 30. The RFID reader/writer section 18 modulates the electric signal of the transmitting data input from the CPU 11 and transmits the data as a radio wave or electromagnetic field from the antenna or the coil antenna.

The RFID tag 30 receives the radio wave or the electromagnetic field output from the RFID reader/writer section 18 and transmits the data to be transmitted to the RFID reader/writer section 18 as a radio wave or an electromagnetic field.

The RFID reader/writer section 18 receives the radio wave or the electromagnetic field transmitted from the RFID tag 30 with the antenna or the coil antenna, and demodulates the obtained electric signal to receive the data.

The imaging section 19 is an imaging section which images a digital image of a subject. The imaging section 19 includes an optical system, an imaging element, etc. With control of the CPU 11, the imaging section 19 performs photoelectric conversion with the imaging element on the light of the image of the subject which enters through the optical system and outputs the result as image data of the subject.

The power source section 20 is a secondary battery such as a lithium battery and supplies power to each section of the portable terminal 10. The power source section 20 can be a primary battery such as an alkaline battery, etc.

Next, the information stored in the portable terminal 10 is described with reference to FIG. 2A and FIG. 2B. FIG. 2A is a diagram showing a configuration of the tag position information table 40. FIG. 2B is a diagram showing the configuration of the image database 50.

The tag position information table 40 shown in FIG. 2A and the image database 50 shown in FIG. 2B are stored in the storage section 17 in the portable terminal 10. The tag position information table 40 includes a number 41, an image data name 42, and tag position information 43.

The number 41 is an identification number of a record of the tag position information table 40. The image data name 42 is the data name to identify image data 51 of the image database 50.

The tag position information 43 is information showing a position of the RFID tag 30 internally mounted in the equipment as an item of the image data 51 corresponding to the image data name 42. The tag position information 43, for example, is coordinate information showing the position of the RFID tag 30 on the image of the item, character information describing the position of the RFID tag 30 and the like.

The image database 50 includes the image data 51. The image data 51 is actual image data of the equipment as the item imaged by the imaging section 19. Each piece of the image data 51 is provided with an image data name (file name) corresponding to the image data name 42.

Next, the operation of the portable terminal 10 of the present embodiment is described with reference to FIG. 3 to FIG. 5B.

FIG. 3 is a flowchart showing first information registration processing.

FIG. 4 is a flowchart showing first information reading processing.

Figure 5A:
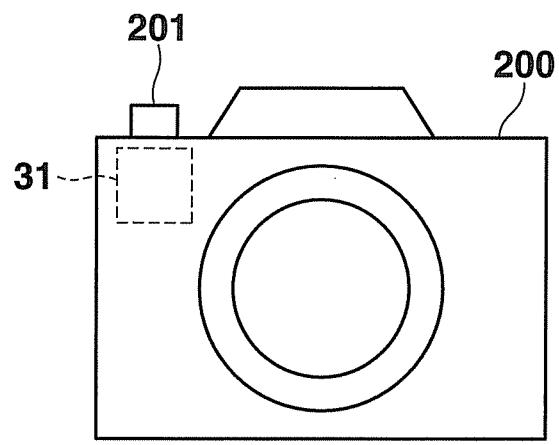
FIG. 5A is a front view showing an outer appearance of a digital camera.

FIG. 5A is a front view showing an outer appearance of the digital camera 200.

Figure 5B:
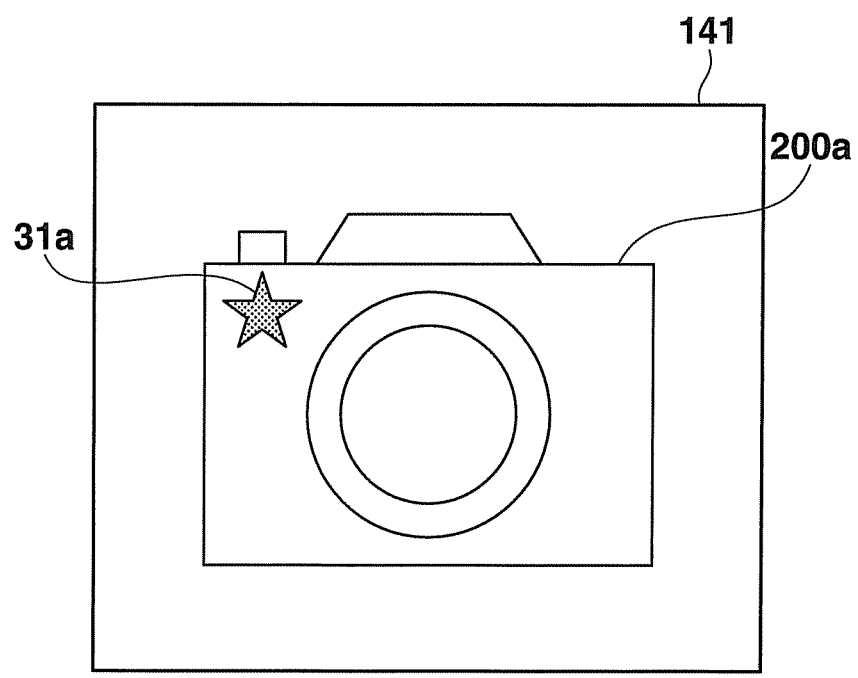
FIG. 5B is a diagram showing a display image.

FIG. 5B is a diagram showing a display image 141.

First, the first information registration processing is described with reference to FIG. 3.

The first information registration processing is processing in which the item (equipment) with the RFID tag 30 internally mounted is captured, and the image data is registered in the image database 50, and the image data name and the tag position information of the RFID tag 30 is registered in the tag position information table 40.

The item is equipment which is a target of registration of the tag position information to be used for business purposes.

In the portable terminal 10, for example, the start of performing the first information registration processing input on the operation section 12 by the user acts as a trigger and the CPU 11 performs the first information registration processing in coordination with the first information registration program 151 read from the ROM 15 and suitably expanded in the RAM 13.

First, the CPU 11 starts the RFID reader/writer section 18 and the imaging section 19 (step S11).

In step S11, the RFID reader/writer section 18 can read the information stored in the RFID tag 30 and the imaging section 19 can image the item.

The display section 14 displays, for example, a preview image imaged by the imaging section 19.

Here, the user moves the portable terminal 10 to read the information of the RFID tag 30 in order to find where the RFID tag 30 is positioned in the equipment.

Then, the CPU 11 judges whether or not the RFID tag 30 is detected by whether or not communication with the RFID tag 30 is established by the RFID reader/writer section 18 (step S12). When the RFID tag 30 is not detected (step S12; NO), the processing advances to step S12.

When the RFID tag 30 is detected (step S12; YES), the CPU 11 displays on the display section 14 information that the RFID tag 30 is detected (step S13).

The information that the RFID tag 30 is detected can be notified by emitting light with LED (Light Emitting Diode), output of a buzzer sound, or the like.

The user can find the position of the RFID tag 30 in the item by the position of the RFID reader/writer section 18 when the RFID tag 30 is detected.

Then, the item is the subject, and the user moves the portable terminal 10 to direct the imaging direction of the imaging section 19 toward the item which is the subject and starts capturing of, for example, the front side of the item as the outer appearance of the item with the imaging section 19.

Then, the CPU 11 judges whether or not the user pressed as input the capturing button on the operation section 12 (step S14). When the capturing button is not pressed as input (step S14; NO), the processing advances to step S14.

When the capturing button is pressed as input (step S14; YES), the CPU 11 captures the item with the imaging section 19 and obtains the image data (step S15). Then, the CPU 11 displays on the display section 14 the image data captured in step S14 (step S16).

Then, the CPU 11 receives the input of the tag position information of the RFID tag 30 from the user through the operation section 12 (step S17).

In step S17, for example, the tag position information is input by specifying the position of the RFID tag 30 on the image displayed in step S16 or by input of character of the description of the position of the RFID tag 30.

Then, the CPU 11 provides an image data name to the image data captured in step S15 to be added to the image data 51 of the image database 50, sets the provided image data name and the tag position information input in step S17 as the image data name 42 and the tag position information 43, provides the number 41 to be added to the tag position information table 40, and the above are stored in the storage section 17 (step S18).

Then, the CPU 11 judges whether or not to end the first information registration processing according to whether or not there is an input of an instruction to end the first information registration processing through the operation section 12 (step S19). When the first information registration processing is not ended (step S19; NO), the processing is advanced to step S12.

When the first information registration processing ends (step S19; YES), the CPU 11 turns off the RFID reader/writer section 18 and the imaging section 19 (step S20), and the first information registration processing ends.

Next, the first information reading processing is described with reference to FIG. 4.

The first information reading processing is a processing where the item as the equipment after use in the task is captured, the tag position information of the RFID tag 30 internally mounted in the item is notified to the user using the captured image data and the information stored in the RFID tag 30 is read.

In the portable terminal 10, for example, the start of performing the first information reading processing input on the operation section 12 by the user acts as a trigger and the CPU 11 performs the first information reading processing in coordination with the first information reading program 152 read from the ROM 15 and suitably expanded in the RAM 13.

First, the CPU 11 receives input of whether or not to set the notification setting of the tag position information from the user through the operation section 12 and sets the notification setting (step S31).

Then, the CPU 11 judges whether or not the notification setting of the tag position information is set in step S31 (step S32). When the notification setting is set (step S32; YES), the CPU 11 starts the imaging section 19 (step S33).

Then, the CPU 11 starts the RFID reader/writer section 18 (step S34). When the notification setting is not set (step S32; NO), the processing advances to step S34.

Here, the user moves the portable terminal 10 to start reading of the information (individual identification information) stored in the RFID tag 30 mounted internally in the item. The item here is the equipment checked to confirm whether the equipment is present after use in the task.

Then, the CPU 11 judges whether or not the reading of the information stored in the RFID tag 30 internally mounted in the item by the RFID reader/writer section 18 is complete (step S35).

When the information reading of the RFID tag 30 is not complete (step S35; NO), the CPU 11 judges whether or not the notification setting of the tag position information is set in step S31 (step S36).

When the notification setting is set (step S36; YES), the CPU 11 captures the item with the imaging section 19 (step S37).

In step S37, the item is the subject, and the user moves the portable terminal 10 to direct the imaging direction of the imaging section 19 toward the item which is the subject and presses as input the capturing button of the operation section 12. The CPU 11 captures the item with the imaging section 19 according to the pressing of the capturing button as input and obtains the image data.

Then, the CPU 11 refers the image of the image data obtained in step S37 and the image of the image data 51 of the image database 50 stored in the storage section 17 and retrieves the image data 51 including the matching item which is the subject (step S38). For example, the image is referred in step S38 by judging the match of characteristic points of the image.

Then, the CPU 11 judges whether or not the image data 51 of the item is retrieved in step S38 (step S39).

When the image data 51 is retrieved (step S39; YES), the CPU 11 reads the tag position information 43 corresponding to the image data name 42 of the retrieved image data 51 of the item from the tag position information table 40 stored in the storage section 17 and displays the tag position information on the display section 14 to notify to the user (step S40).

Specifically, as shown in FIG. 5B, the image 200a of the digital camera 200 is displayed on the display section 14 together with the display mark 31a corresponding to the tag position information in the image 200a.

In other words, the tag position information showing the position of the RFID tag 31 is notified to the user by the position of the display mark 31a in the image 200a of the digital camera 200.

According to the notified tag position information, the user moves the portable terminal 10 so that the RFID reader/writer section 18 faces the RFID tag 30.

Then, the CPU 11 judges whether or not the RFID tag 30 is detected according to whether or not communication with the RFID tag 30 is established by the RFID reader/writer section 18 (step S41).

When the RFID tag 30 is not detected (step S41; NO), the processing advances to step S36. When the notification setting is not set (step S36; NO), or the image data 51 is not retrieved (step S39; NO), the processing advances to step S41.

When the RFID tag 30 is detected (step S41; YES), the CPU 11 performs communication with the RFID tag 30 using the RFID reader/writer section 18 and reads the information stored in the RFID tag 30 (step S42).

Then, the CPU 11 judges whether or not communication with the RFID tag 30 is ended in step S42 (step S43).

When communication with the RFID tag 30 continues (step S43; NO), the processing advances to step S42. When the communication with the RFID tag 30 ends (step S43; YES), the processing advances to step S35.

When the reading of the information stored in the RFID tag 30 is complete (step S35; YES), the CPU 11 stores the information (individual identification information) read in step S42 in the RAM 13 or the storage section 17 and displays the information on the display section 14 (step S44).

Alternatively, it is possible to store in the storage section 17 in advance the individual identification information corresponded with the item name, and to read from the storage section 17 the item name corresponding to the read individual identification information to be displayed on the display section 14 in step S44.

Then, the CPU 11 turns off the RFID reader/writer section 18 and the imaging section 19 (step S45), and ends the first information reading processing.

Here, a specific example of the tag position information in the first information registration processing is described with reference to FIG. 5A and FIG. 5B.

The following example describes a case of registration of the tag position information of a digital camera 200 which is one of the equipment as the item of the target of which information is read in the first information registration processing as shown in FIG. 5A.

The digital camera 200 includes a shutter button 201 and is internally mounted with a RFID tag 31 as the RFID tag 30 near the shutter button 201.

First, the first information registration processing is performed, and in step S15, the front face of the digital camera 200 is captured to obtain the image data of the digital camera 200.

In step S16, the image of the digital camera 200 is displayed on the display section 14. Then, in step S17, the coordinate information of the position of the RFID tag 31 in the image of the digital camera 200 is input.

In step S18, the image data of the digital camera 200 is stored in the image database 50, and the image data name of the image data and the tag position information are stored in the tag position information table 40.

Then, the first information reading processing is performed, and in step S37, the front face of the digital camera 200 is captured and in step S38, the image data 51 which matches with the digital camera 200 is retrieved.

Then, in step S40, the display image 141 of the digital camera 200 shown in FIG. 5B is displayed on the display section 14.

The display image 141 includes the image 200a of the digital camera 200 and the display mark 31a corresponding to the tag position information. The user can confirm by sight the tag position of the RFID tag 31 by the position of the display mark 31a.

In step S17 when a character showing the position of the RFID tag 31 in the image of the digital camera 200 is input, in step S38, for example, a sentence such as "below the shutter button of the front face of the digital camera" is input as tag position information.

According to the present embodiment, in the portable terminal 10, the storage section 17 stores the tag position information table 40 and the image database 50, the CPU 11 retrieves the image data 51 of the item corresponding to the subject of the image data imaged by the imaging section 19 from the image data 51 as the item identification information stored in the image database 50, and when the data is retrieved, the tag position information 43 corresponding to the retrieved image data 51 is notified by display of the display section 14. Therefore, the tag position information showing the position of the RFID tag 30 attached to the item can be notified to the user.

After displaying the tag position information, the CPU 11 allows the RFID reader/writer section 18 to start reading of the information stored in the RFID tag 30. Therefore, after notifying the tag position information to the user, it is possible to efficiently read the information stored in the RFID tag 30.

The CPU 11 obtains image data of the item imaged by the imaging section 19 and corresponds the tag position information input on the operation section 12 with the image data to be stored in the storage section 17 as the tag position information table 40 and the image database 50. Therefore, it is possible to easily correspond and store the tag position information and the image data of the item.

(Second Embodiment)

The second embodiment of the present invention is described with reference to FIG. 6 to FIG. 8. According to the first embodiment, the image data obtained by capturing the item is retrieved and the tag position information corresponding to the image data is read.

In the present embodiment, a mark which can be identified is attached to the item, the image data obtained by capturing the mark is retrieved and the tag position information corresponding to the image data is read.

First, a configuration of the apparatus of the present embodiment is described with reference to FIG. 6.

FIG. 6 is a block diagram showing a functional configuration of the portable terminal 10A of the present embodiment.

Here, the same reference numeral is applied to the component of the portable terminal 10A of the present embodiment which is similar to that of the portable terminal 10 of the first embodiment, and the description is omitted.

The portable terminal 10A includes a CPU 11, an operation section 12, a RAM 13, a display section 14, a ROM 15, a wireless communication section 16, a storage section 17, a RFID reader/writer section 18, an imaging section 19, a power source section 20, and a print section 22. The sections of the portable terminal 10A other than the power source section 20 are connected to each other through a bus 21.

The ROM 15 stores a second information registration program 153 and a second information reading program 154.

The storage section 17 stores the tag position information table 40 and the image database 50. In the image database 50, image data 51 and image data of a plurality of marks which can be identified are stored in advance.

The mark of the image data 51 can be any design or shape which can be identified and it is preferable that the design or shape is set so that the match of the image is easy when referring the image. The mark of the image data 51 can include a character.

The print section 22 is a print section such as a thermal transfer printer and is a print section which prints and outputs information on a sheet according to an instruction from the CPU 11. In the present embodiment, the print section 22 prints various marks on a sticker sheet with a base sheet as the sheet.

Next, the operation of the portable terminal 10A of the present embodiment is described with reference to FIG. 7 and FIG. 8.

Figure 7:
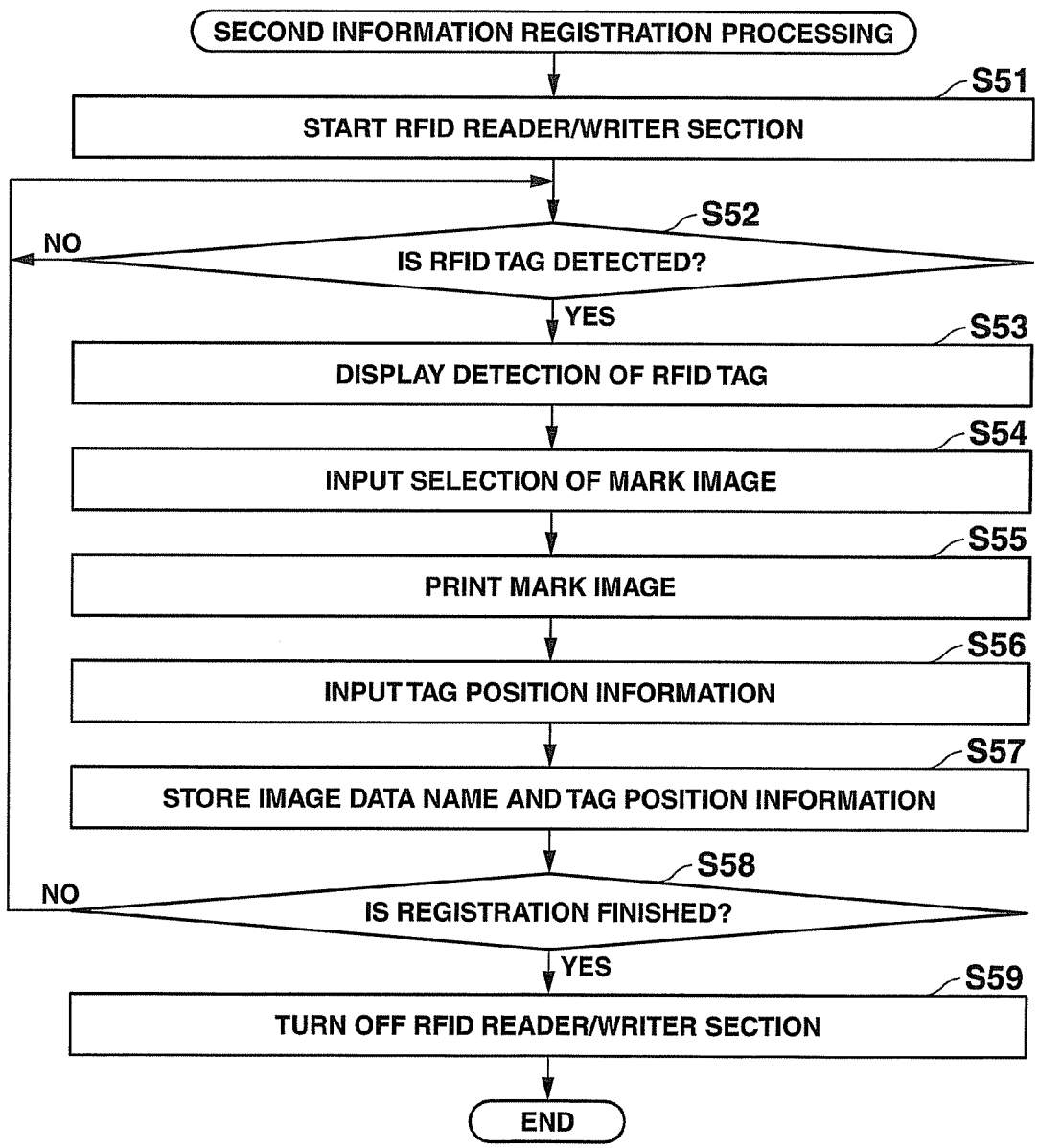
FIG. 7 is a flowchart showing second information registration processing.

FIG. 7 is a flowchart showing second information registration processing.

Figure 8:
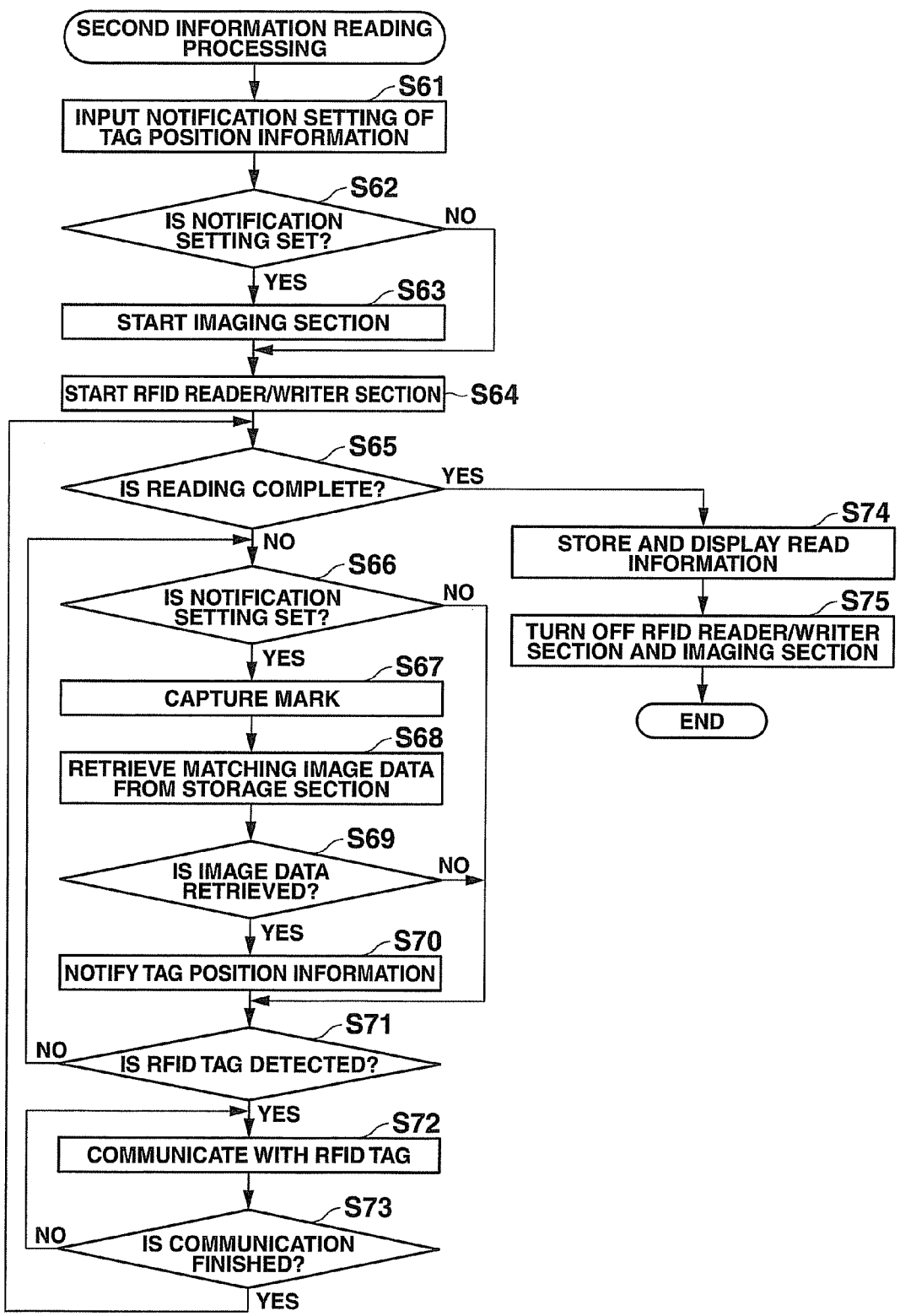
FIG. 8 is a flowchart showing second information reading processing.

FIG. 8 is a flowchart showing second information reading processing.

First, the second information registration processing is described with reference to FIG. 7.

The second information registration processing is processing in which the mark to identify the item (equipment) with the RFID tag 30 internally mounted is printed, and the image data name of the image data of the mark and the tag position information of the RFID tag 30 are registered in the tag position information table 40.

In the portable terminal 10A, for example, the start of performing the second information registration processing input on the operation section 12 by the user acts as a trigger and the CPU 11 performs the second information registration processing in coordination with the second information registration program 153 read from the ROM 15 and suitably expanded in the RAM 13.

Steps S51 to S53 are similar to the steps S11 to S13 of the first information registration processing shown in FIG. 3.

Then, the CPU 11 refers to the tag position information table 40 stored in the storage section 17 and reads the image data 51 including the image data name not found in the image data name 42 from the image database 50.

Then, the CPU 11 displays the mark image of the read image data 51 as the candidate to be selected to be corresponded to the item on the display section 14, receives the input of the selection of the mark image from the user through the operation section 12 and sets the selection as the mark image of the item (step S54).

Then, the CPU 11 uses the image data 51 of the mark image selected in step S54 to print the mark image on the sticker sheet with the print section 22 (step S55).

Here, the user peels the sticker sheet with the mark image printed in step S55 from the mounting sheet and attaches the sticker sheet to the item.

Then, the CPU 11 receives the input of the tag position information of the RFID tag 30 from the user through the operation section 12 (step S56). In step S56, for example, the tag position information is input by, for example, character input of the description of the position of the RFID tag 30.

Then, the CPU 11 provides an image data name to the image data 51 of the mark image selected in step S54, sets the provided image data name and the tag position information input in step S56 as the image data name 42 and the tag position information 43, provides the number 41 to be added to the tag position information table 40, and the above are stored in the storage section 17 (step S57).

Steps S58 and S59 are similar to steps S19 and S20 of the first information registration processing shown in FIG. 3.

Next, the second information reading processing is described with reference to FIG. 8. The second information reading processing is a processing where the mark attached to the item is captured, the tag position information of the RFID tag 30 mounted internally in the item is notified to the user using the captured image data and the information stored in the RFID tag 30 is read.

In the portable terminal 10A, for example, the start of performing the second information reading processing input on the operation section 12 by the user acts as a trigger and the CPU 11 performs the second information reading processing in coordination with the second information reading program 154 read from the ROM 15 and suitably expanded in the RAM 13.

Steps S61 to S66 are similar to the steps S31 to S36 of the first information reading processing shown in FIG. 4. When the notification setting is set (step S66; YES), the CPU 11 captures the mark attached to the item with the imaging section 19 (step S67).

In step S67, the mark attached to the item is the subject, and the user moves the portable terminal 10A to direct the imaging direction of the imaging section 19 toward the mark which is the subject and presses as input the capturing button of the operation section 12. The CPU 11 captures the mark with the imaging section 19 according to input of pressing the capturing button and obtains the image data.

Steps S68 to S75 are similar to steps S38 to S45 of the first information reading processing shown in FIG. 4.

According to the present embodiment, in the portable terminal 10A, the storage section 17 stores the tag position information table 40 and the image database 50, the CPU 11 retrieves the image data 51 of the mark corresponding to the subject of the image data imaged by the imaging section 19 from the image data 51 of the mark as the item identification information stored in the image database 50, and when the image data 51 is retrieved, the tag position information 43 corresponding to the retrieved image data 51 is notified by display on the display section 14. Therefore, the tag position information showing the position of the RFID tag 30 attached to the item can be notified to the user.

Moreover, after the tag position information is displayed, the CPU 11 allows the RFID reader/writer section 18 to start reading of the information stored in the RFID tag 30. Therefore, after the tag position information is notified to the user, it is possible to efficiently read the information stored in the RFID tag 30.

Moreover, the CPU 11 sets the image data 51 of the mark corresponding to the item, allows the print section 22 to print the mark with the set image data 51, corresponds the tag position information input by the operation section 12 with the image data name of the set image data 51, and stores the above as the tag position information table 40 in the storage section 17. Therefore, the tag position information and the image data of the mark can be easily corresponded and stored.

(Third Embodiment)

Figure 10:
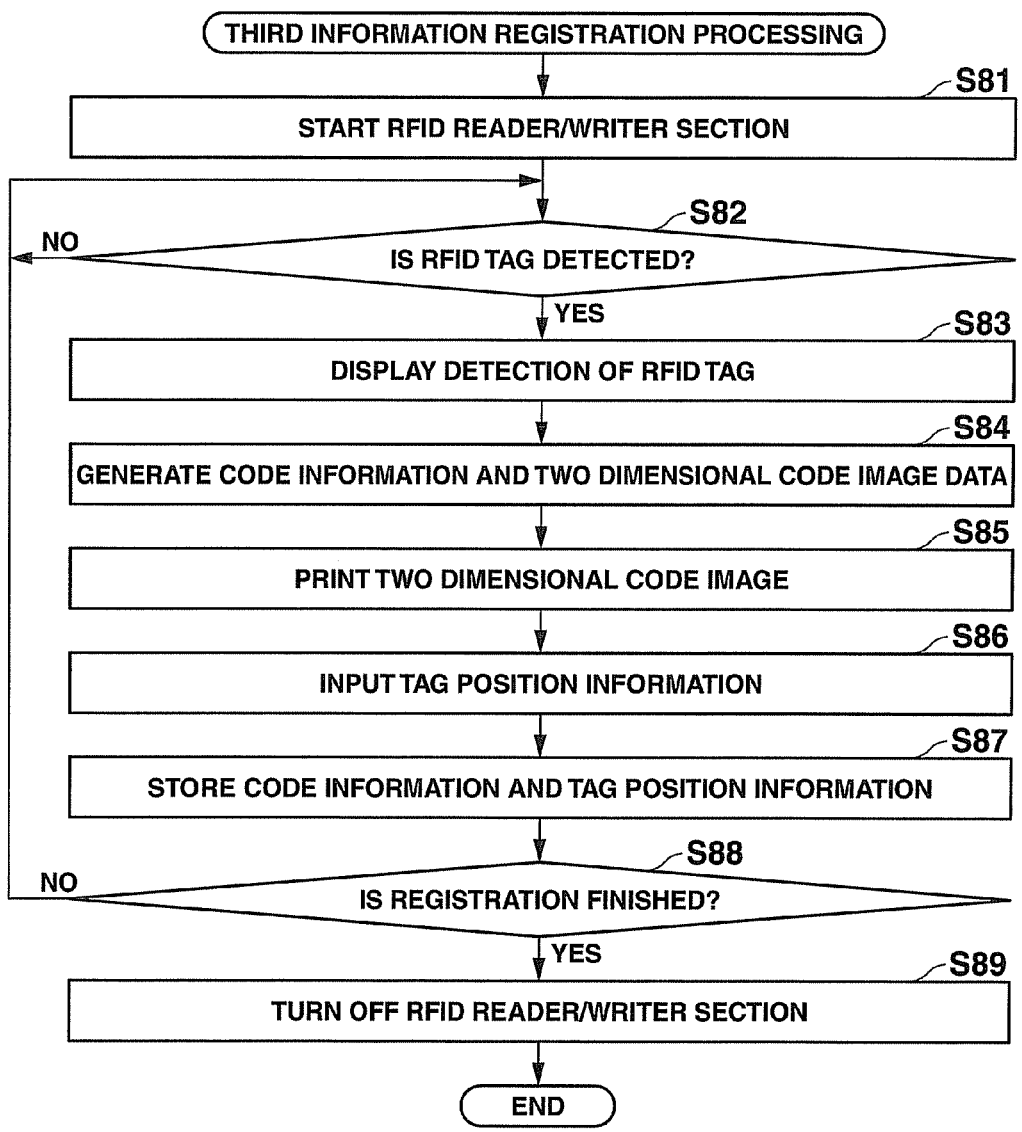
FIG. 10 is a flowchart showing third information registration processing.
Figure 11:
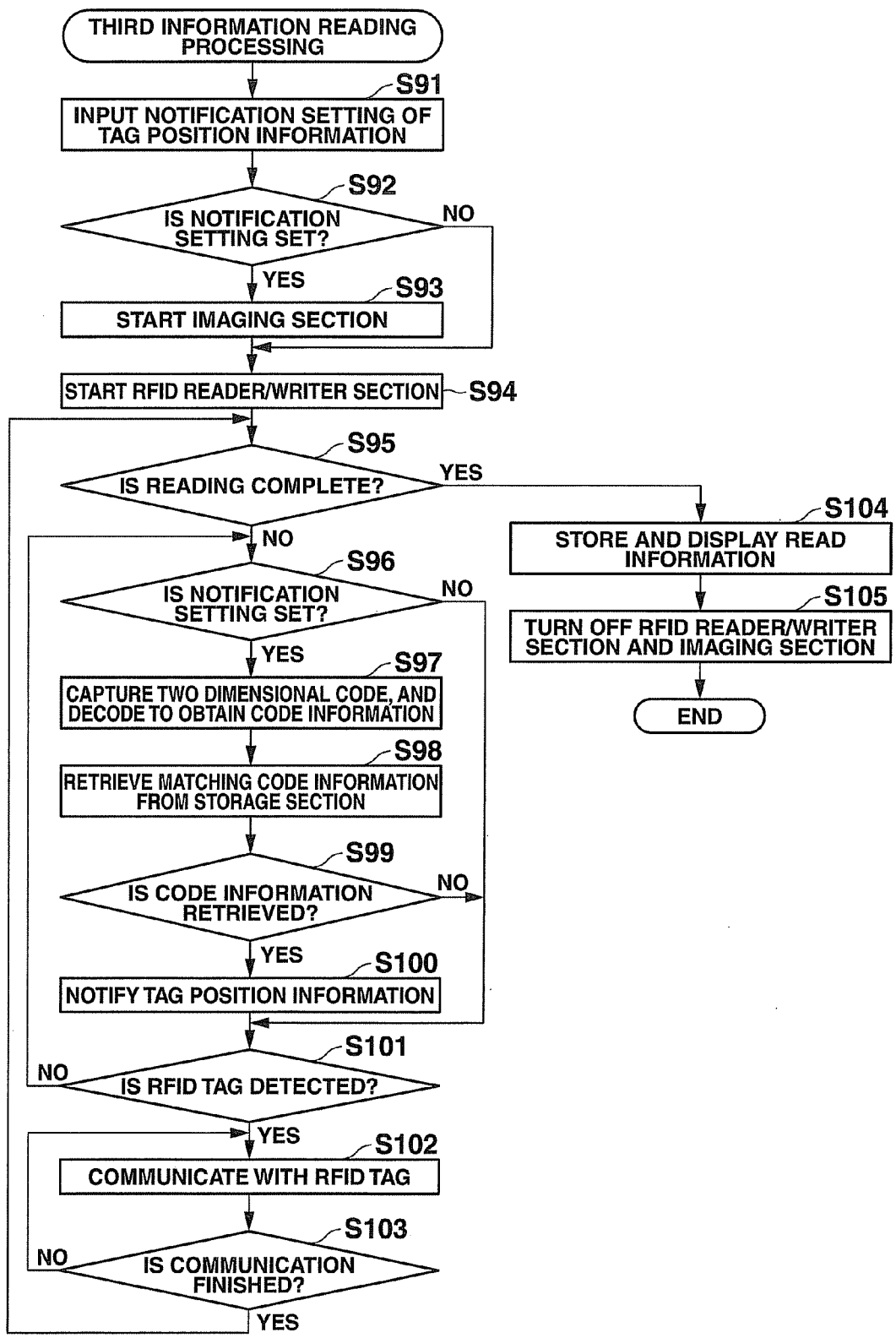
FIG. 11 is a flowchart showing third information reading processing.

The third embodiment of the present invention is described with reference to FIG. 9 to FIG. 11.

In the present embodiment, the two dimensional code as a symbol which can be identified is attached to the item, the two dimensional code is captured to decode the image data, the obtained code information is retrieved and the tag position information corresponding to the code information is read.

The symbol attached to the item is not limited to a two dimensional code and can be a one dimensional barcode.

First, the configuration of the apparatus of the present embodiment is described. In the present embodiment, similar to the second embodiment, the portable terminal 10A is used. However, the ROM 15 stores a third information registration program and a third information reading program instead of the second information registration program 153 and the second information reading program 154. Moreover, the storage section 17 stores the tag position information table 60 instead of the tag position information table 40 and the image database 50.

Next, the information stored in the storage section 17 is described with reference to FIG. 9.

FIG. 9 is a diagram showing a configuration of the tag position information table 60.

In the portable terminal 10A, the tag position information table 60 shown in FIG. 9 is stored in the storage section 17. The tag position information table 60 includes a number 61, code information 62, and tag position information 63.

The number 61 is an identification number of a record of the tag position information table 60. The code information 62 is code information included in the two dimensional code printed by the portable terminal 10A.

The tag position information 63 is information showing the position of the RFID tag 30 internally mounted in the equipment as the item with the two dimensional code corresponding to the code information 62 attached. For example, the tag position information 63 is character information describing the position of the RFID tag 30.

Next, the operation of the portable terminal 10A of the present embodiment is described with reference to FIG. 10 and FIG. 11. FIG. 10 is a flowchart showing the third information registration processing. FIG. 11 is a flowchart showing the third information reading processing.

First, the third information registration processing is described with reference to FIG. 10. The third information registration processing is processing in which the two dimensional code to identify the item (equipment) with the RFID tag 30 internally mounted is printed and the code information of the two dimensional code and the tag position information of the RFID tag 30 are registered in the tag position information table 60.

In the portable terminal 10A, for example, the start of performing the third information registration processing input on the operation section 12 by the user acts as a trigger and the CPU 11 performs the third information registration processing in coordination with the third information registration program read from the ROM 15 and suitably expanded in the RAM 13.

Steps S81 to S83 are similar to steps S11 to S13 of the first information registration processing shown in FIG. 3. Then, the CPU 11 generates unique code information to identify the item and generates two dimensional code image data of the two dimensional code image including the code information (step S83).

Then, the CPU 11 allows the print section 22 to print the two dimensional code image on the sticker sheet using the two dimensional code image data generated in step S83 (step S85). Here, the user peels the sticker sheet with the mark image printed in step S85 from the mounting sheet and attaches the sticker sheet to the item.

Then, the CPU 11 receives input of the tag position information of the RFID tag 30 from the user through the operation section 12 (step S86). For example, in step S86, the tag position information is input by input of character of the description of the position of the RFID tag 30.

Then, the CPU 11 sets the code information generated in step S84 and the tag position information input in step S86 as the code information 62 and the tag position information 63, provides the number 61 to be added to the tag position information table 60, and the above are stored in the storage section 17 (step S87).

Steps S88, S89 are similar to steps S19, S20 of the first information registration processing shown in FIG. 3.

Next, the third information reading processing is described with reference to FIG. 11. The third information reading processing is processing where the two dimensional code attached to the item is captured, the captured image data is decoded, the tag position information of the RFID tag 30 internally mounted in the item is notified to the user using the obtained code information, and the information stored in the RFID tag 30 is read.

In the portable terminal 10A, for example, the start of performing the third information reading processing input on the operation section 12 by the user acts as a trigger and the CPU 11 performs the third information reading processing in coordination with the third information reading program read from the ROM 15 and suitably expanded in the RAM 13.

Steps S91 to S96 are similar to steps S31 to S36 of the first information reading processing shown in FIG. 4. When the notification setting is set (step S96; YES), the CPU 11 captures the two dimensional code attached to the item with the imaging section 19 to obtain the image data and the image data is decoded to obtain the code information (step S97).

In step S97, the two dimensional code attached to the item is the subject, and the user moves the portable terminal 10A to direct the imaging direction of the imaging section 19 toward the two dimensional code and presses as input the capturing button of the operation section 12. The CPU 11 captures the two dimensional code with the imaging section 19 according to the input of pressing the capturing button to obtain the image data, and decodes the image data.

Then, the CPU 11 retrieves the code information 62 of the tag position information table 60 stored in the storage section 17 which matches with the code information obtained in step S97 (step S98). The steps S99 to S105 are similar to the steps S39 to S45 of the first information reading processing shown in FIG. 4.

According to the present embodiment, in the portable terminal 10A, the storage section 17 stores the tag position information table 60, the CPU 11 decodes the image data of the two dimensional code imaged by the imaging section 19 to obtain the code information, the obtained code information is retrieved from the code information 62 as the item identification information stored in the tag position information table 60, and when the obtained code information is retrieved, the tag position information 63 corresponding to the retrieved code information 62 is notified by display on the display section 14. Therefore, the tag position information showing the position of the RFID tag 30 attached to the item can be notified to the user.

Moreover, after displaying the tag position information, the CPU 11 allows the RFID reader/writer section 18 to start reading of the information stored in the RFID tag 30. Therefore, after the tag position information is notified to the user, it is possible to efficiently read the information stored in the RFID tag 30.

Moreover, the CPU 11 generates code information corresponding to the item and the image data of the two dimensional code including the code information, prints the two dimensional code with the print section 22 using the generated image data, corresponds the tag position information input on the operation section 12 with the generated code information, and stores the above as the tag position information table 60 in the storage section 17. Therefore, it is possible to easily correspond and store the tag position information and the code information of the two dimensional code.

The above example discloses an example where a ROM 15 is used as the computer readable medium including the program of the present invention. However, the present invention is not limited to the above example.

As other computer readable mediums, for example it is possible to apply a nonvolatile memory such as a flash memory or a portable storage medium such as a CD-ROM.

Moreover, as a medium to provide the data of the program of the present invention through communication lines, a carrier wave can be applied to the present invention.

The descriptions of the above embodiments are examples of the portable terminals and programs of the present invention, and the present invention is not limited to the above.

The above embodiments describe the portable terminals 10, 10A are handy terminals, however, the present invention is not limited to the above. Other portable terminals can be used as portable terminals of the present invention, for example, a PDA (Personal Digital Assistant), a cellular phone, a laptop computer, etc.

In the above described embodiments, the RFID tag 30 includes a RFID card (non-contact IC card).

The above embodiments describe notification of the tag position information by display on the display section 14, however, the present invention is not limited to the above. For example, the portable terminals 10, 10A can include an audio output section and the notification of the tag position information can be performed by audio output from the audio output section.

The above embodiments describe creating tag position information according to input by operation of the user and image data and storing the above as the tag position information table 40, the image database 50, and the tag position information table 60 in the storage section 17, however, the present invention is not limited to the above.

For example, a manufacturer, a manager, etc. of the item with the RFID tag 30 attached can create the tag position information table 40, the image database 50, and the tag position information table 60 to be stored in the computer.

The portable terminals 10, 10A can download the tag position information table 40, the image database 50, and the tag position information table 60 from the computer of the manufacturer, etc. through the wireless communication section 16 and store the above in the storage section 17.

The detailed configuration and operation of each component of the portable terminals 10, 10A of the above embodiments can be suitably changed without leaving the scope of the invention.

The entire disclosure of Japanese Patent Application No. 2012-048924 filed on Mar. 6, 2012 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A portable terminal including an imaging section, comprising:
   a storage control section which stores, in a storage section, item identification information to identify an item with a wireless ID tag internally mounted inside the item and corresponding internally mounted position information which identifies a position of where the wireless ID tag is mounted inside the item;
   a retrieving section which retrieves from the storage section the stored item identification information of the item corresponding to image data imaged by the imaging section and reads out the internally mounted position information corresponding to the retrieved item identification information when the wireless ID tag is not yet detected; and
   a display control section which displays, on a display screen, the image data imaged by the imaging section and a mark overlaying the item in the image data showing the position of where the wireless ID tag is mounted inside the item according to the internally mounted position information read out from the storage section by the retrieving section.

2. The portable terminal according to claim 1, further comprising:
   a reading section which reads information of the wireless ID tag; and
   a reading control section which allows the reading section to start reading the information of the wireless ID tag after the display control section displays the mark overlaying the image data showing the position of where the wireless ID tag is attached to the item.

3. The portable terminal according to claim 1, wherein the stored item identification information is image data of the item; and
   the display control section retrieves the stored image data of the item which matches a subject of the image data imaged by the imaging section.

4. The portable terminal according to claim 3, further comprising:
   an operation section which receives input of an operation, wherein the storage control section obtains the stored image data of the item and stores in the storage section the tag position information received during the inputted operation that corresponds to the stored image data.

5. The portable terminal according to claim 1,
   wherein the item identification information is image data of a mark to identify the item;
   the imaging section images the mark attached to the item; and
   the retrieving section retrieves the image data of the mark which matches a subject of the image data imaged by the imaging section.

6. The portable terminal according to claim 5, further comprising:
   an operation section which receives input of an operation; and
   a print section which prints an image of the image data, wherein
   the storage control section sets the image data of the mark corresponding to the item, allows the print section to print the mark with the set image data, and stores in the storage section the tag position information received during the inputted operation that corresponds to the set image data.

7. The portable terminal according to claim 1,
   wherein the item identification information is code information of a symbol to identify the item;
   the imaging section images the symbol attached to the item; and
   the retrieving section decodes the image data imaged by the imaging section to obtain the code information and retrieves the obtained code information from the code information stored in the storage section.

8. The portable terminal according to claim 7, further comprising:
   an operation section which receives input of an operation; and
   a print section which prints an image of the image data, wherein the storage control section generates code information corresponding to the item and image data of the symbol including the code information, allows the print section to print the symbol with the generated image data, and stores in the storage section the tag position information received during the inputted operation that corresponds to the generated code information.

9. A non-transitory computer-readable storage medium having a program stored thereon for controlling a computer of a portable terminal including an imaging section to execute the following process:
   storing, in a storage section, item identification information to identify an item with a wireless ID tag internally mounted inside the item and corresponding internally mounted position information which shows a position of where the wireless ID tag is mounted inside the item;
   retrieving from the storage section the stored item identification information of the item corresponding to image data imaged by the imaging section and reading out the internally mounted position information corresponding to the retrieved item identification information when the wireless ID tag is not yet detected; and
   displaying, on a display screen, the image data imaged by the imaging section and a mark overlaying the item in the image data showing the position of where the wireless ID tag is mounted inside the item according to the internally mounted position information read out from the storage section by the retrieving section.

10. A portable terminal, comprising:
    a storage control section that stores, in a storage section, a captured image of an item and position information of where an RFID tag is internally mounted inside the item, wherein the position information is inputted into the portable terminal during a registration process for the item;

an imaging section that images a first instance of the item as the captured image during the registration process and images a second instance of the item during a reading process;

a retrieving section that determines, in response to the reading process, whether the second instance of the item matches the stored captured image when the wireless ID tag is not yet detected; and a display control section that displays, on a display screen and in response to the determination that the second instance of the item matches the stored captured image, the second instance of the item including a mark overlaying the second instance of the item showing a position of where the RFID tag is internally mounted inside the item according to the stored position information inputted into the portable terminal.

* * * * *